United States Patent Office 3,557,087
Patented Jan. 19, 1971

3,557,087
SYNTHESIS OF STEROIDS
Seymour D. Levine, North Brunswick, N.J., assignor to E. R. Squibb & Sons, Inc., New York, N.Y., a corporation of Delaware
No Drawing. Filed Nov. 29, 1967, Ser. No. 686,744
Int. Cl. C07d 39/00
U.S. Cl. 260—239    2 Claims

ABSTRACT OF THE DISCLOSURE

This invention relates to the preparation of novel steroidal β-lactams having the formula:

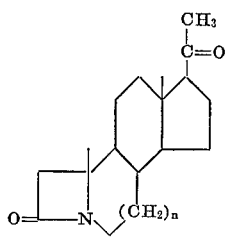

wherein $n$ represents 1 or 2. The β-lactams of this invention are physiologically active materials possessing anti-androgenic activity.

---

This invention relates to and has as its objective the provision of novel physiologically active steroids and new intermediates useful in the preparation thereof.

The final products of this invention can be represented by the general formula:

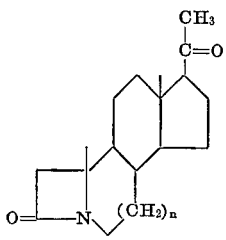

wherein $n$ represents 1 or 2.

The final products of this invention are physiologically active substances useful in both human and veterinary medicine. They are highly useful agents in inhibiting or counteracting the effects of androgens (being therefore called anti-androgens) such as testosterone. For example, abatement of skin eruptions in cases of hyperandrogenic acne (the acne condition resulting from the overabundance of an androgen such as testosterone) may be achieved by the peroral administration of the anti-androgens of this invention in dosages of from about 10 to 200 mg./kg. of body weight daily. They may also be administered systemically (e.g., subcutaneously) in a dosage of from about 2 to 60 mg./kg. of body weight daily. Further topical application may be employed in the treatment of this condition, utilizing, for instance, a cream or lotion containing from about 1 to 25% of the final product of this invention.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes they may be administered orally at a dosage of about 10 to 200 mg./kg. of body weight daily, or parenterally at a dosage of about 2 to 60 mg./kg. of body weight daily.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also one-piece gelatin capsules containing the same amount of medicament may be prepared using sufficient corn oil or other suitable vegetable oil to render the compound capsulatable. Tablets may be prepared by using starch, lactose or other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The final products of this invention may be formulated into a preparation suitable for topical administration in conventional manner with the aid of one or more carriers or excipients. Examples of types of topical formulation include ointments, creams, sprays, aerosols, and the like. Ointments and creams may, for example, be formulated with an aqueous or oily base with the addition of suitable thickening and/or gelling agents. Such bases may, for example, include water and/or an oil such as liquid paraffin or a vegetable oil such as castor oil, arachis oil, or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediate and final products) are surface active agents which may therefore be employed in a variety of applications requiring such an agent. For example, the compounds of this invention may be employed as emulsifying agents in the preparation of lubricants, adhesives, polishes, wax compositions, and the like. For these purposes the compounds of this invention may be employed in concentrations of about 0.5 to about 20.0 weight percent based upon the total composition.

They may also be employed as antioxidants and corrosion inhibitors for various hydrocarbons and mixtures thereof. As examples of materials to which the compounds of this invention may be added for this purpose may be mentioned gasoline, hydrocarbon lubricating oils and greases, hydrocarbon solvents (e.g., toluene, kerosene), rubber, polyolefin plastics (e.g., polyethylene, polypropylene) and the like. For this puurpose they may be employed in concentrations ranging from about 0.01 to about 1.0 weight percent based upon the total composition.

The final products of this invention may be prepared beginning with either A-norprogesterone or A-nor-B-norprogesterone in accordance with the following reaction schema, wherein Ac represents acetyl, and n represents 1 or 2:

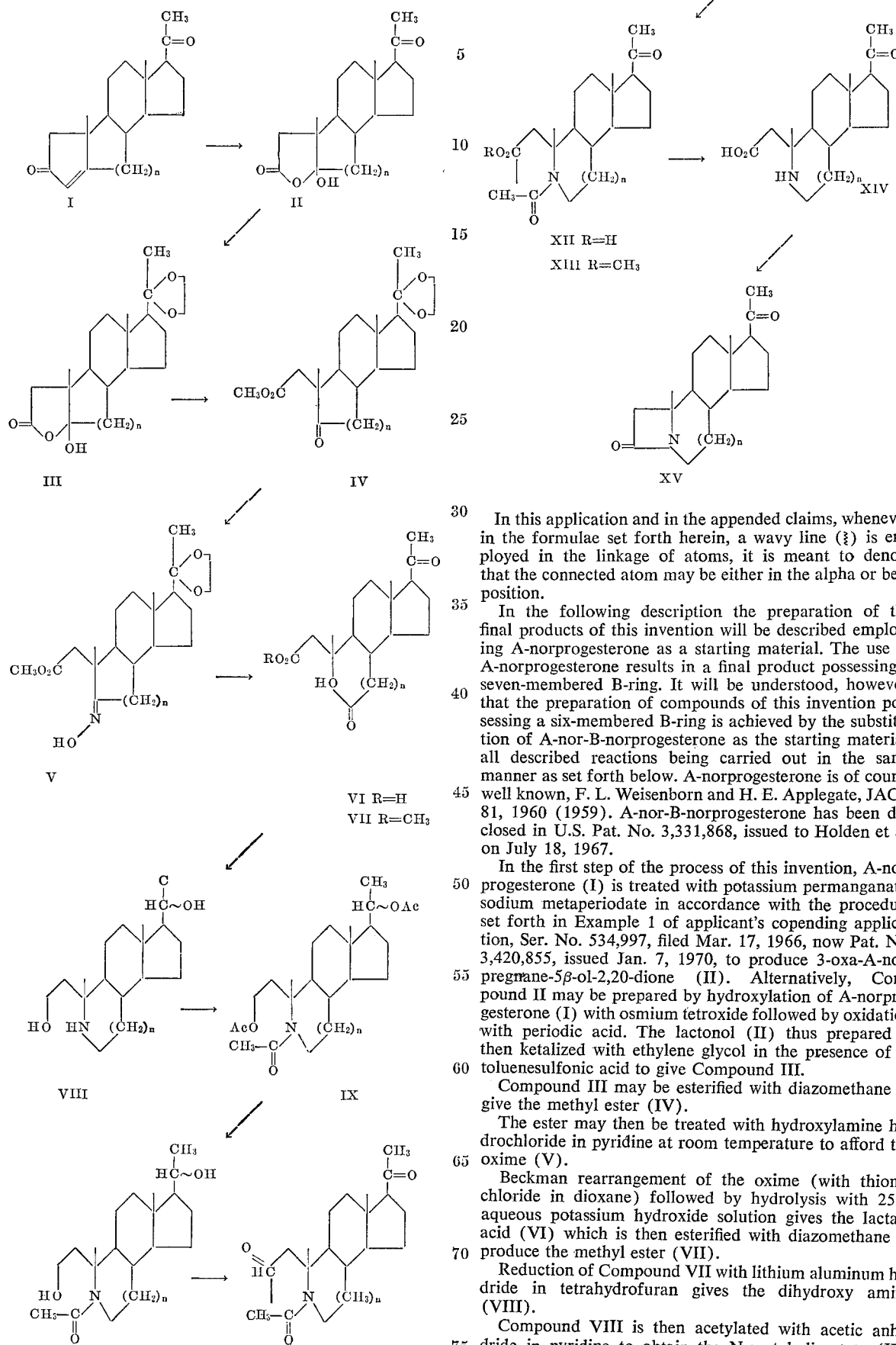

In this application and in the appended claims, whenever in the formulae set forth herein, a wavy line (∫) is employed in the linkage of atoms, it is meant to denote that the connected atom may be either in the alpha or beta position.

In the following description the preparation of the final products of this invention will be described employing A-norprogesterone as a starting material. The use of A-norprogesterone results in a final product possessing a seven-membered B-ring. It will be understood, however, that the preparation of compounds of this invention possessing a six-membered B-ring is achieved by the substitution of A-nor-B-norprogesterone as the starting material, all described reactions being carried out in the same manner as set forth below. A-norprogesterone is of course well known, F. L. Weisenborn and H. E. Applegate, JACS, 81, 1960 (1959). A-nor-B-norprogesterone has been disclosed in U.S. Pat. No. 3,331,868, issued to Holden et al. on July 18, 1967.

In the first step of the process of this invention, A-norprogesterone (I) is treated with potassium permanganate-sodium metaperiodate in accordance with the procedure set forth in Example 1 of applicant's copending application, Ser. No. 534,997, filed Mar. 17, 1966, now Pat. No. 3,420,855, issued Jan. 7, 1970, to produce 3-oxa-A-nor-pregnane-5β-ol-2,20-dione (II). Alternatively, Compound II may be prepared by hydroxylation of A-norprogesterone (I) with osmium tetroxide followed by oxidation with periodic acid. The lactonol (II) thus prepared is then ketalized with ethylene glycol in the presence of p-toluenesulfonic acid to give Compound III.

Compound III may be esterified with diazomethane to give the methyl ester (IV).

The ester may then be treated with hydroxylamine hydrochloride in pyridine at room temperature to afford the oxime (V).

Beckman rearrangement of the oxime (with thionyl chloride in dioxane) followed by hydrolysis with 25% aqueous potassium hydroxide solution gives the lactam acid (VI) which is then esterified with diazomethane to produce the methyl ester (VII).

Reduction of Compound VII with lithium aluminum hydride in tetrahydrofuran gives the dihydroxy amine (VIII).

Compound VIII is then acetylated with acetic anhydride in pyridine to obtain the N-acetyl diacetate (IX)

which is selectively hydrolyzed with potassium carbonate in methanol to the N-acetyl diol (X).

Oxidation of Compound X with Jones reagent $$(CrO_3=H_2SO_4)$$

at ice bath temperature gives the N-acetyl aldehyde (XI) which is then treated with silver oxide at room temperature to produce the N-acetyl amino acid (XII). If desired, Compound XII may then be esterified with diazomethane to produce Compound XIII.

Compounds XII or XIII may be refluxed in dioxane containing concentrated hydrochloric acid to remove the N-acetyl group, thus forming the amino acid (XIV).

The amino acid is then cyclized by treatment at room temperature with dicyclohexylcarbodiimide in nitromethane to produce the steroidal β-lactam (XV), which is a final product of this invention.

The invention may be illustrated by the following examples wherein all temperatures are in degrees centigrade:

EXAMPLE 1

3-oxa-A-norpregnane-5β-ol-2,20-dione 20 ethylene ketal

A solution of 200 mg. of 3-oxa-A-norpregnane-5β-ol-2,20-dione in 2 ml. of ethylene glycol and 35 ml. of benzene containing 10 mg. of p-toluenesulfonic acid is stirred and refluxed for five hours. The reaction mixture is diluted with water and the benzene layer separated. The aqueous phase is extracted with additional benzene. The combined benzene extracts are evaporated to give 3-oxa-A-norpregnane-5β-ol-2,20-dione 20-ethylene ketal.

EXAMPLE 2

Methyl 2,5-seco-3,4-bisnorpregnane-5,20-dione 20 ethylene ketal 2-oic acid

A solution of 100 mg. of 3-oxa-A-norpregnane-5β-ol-2,20-dione 20-ethylene ketal in 1 ml. of ether and 1 ml. of methanol is treated with an excess of diazomethane in ether and left at room temperature for 10 minutes. Acetic acid is added and the mixture evaporated to give methyl 2,5-seco-3,4-bisnorpregnane-5,20-dione 20-ethylene ketal 2-oic acid.

EXAMPLE 3

Methyl 5-oximino-2,5-seco-3,4-bisnorpregnane-20-one 20-ethylene ketal-2-oic acid A solution of 1 g. of methyl 2,5-seco-3,4-bisnorpregnane-5,20-dione 20-ethylene ketal 2-oic acid and 1 g. of hydroxylamine hydrochloride in 18 ml. of pyridine is left at room temperature for three days. The reaction mixture is diluted with water and the product collected by filtration to give methyl 5-oximino-2,5-seco-3,4-bisnorpregnane-20-one-20-ethylene ketal 2-oic acid.

EXAMPLE 4

2,5-seco-3,4-bisnor-5-aza-B-homopregnane-6,20-dione 2-oic acid

A solution of 500 mg. of methyl 5-oximino-2,5-seco-3,4-bisnorpregnane-20-one-20-ethylene ketal-2-oic acid in 10 ml. of dioxane is cooled to a solid mass and treated with 0.5 ml. of thionyl chloride. After 0.75 hr. at room temperature, this solution is added to 80 ml. of 30% aqueous potassium hydroxide and warmed on a steam bath for 0.5 hr. The solution is cooled and extracted with ether. The aqueous phase is acidified with hydrochloric acid and extracted with chloroform. The chloroform extracts are washed with 8% salt solution, dried and evaporated to give 2,5-seco-3,4-bisnor-5-aza-B-homopregnane-6,20-dione 2-oic acid.

EXAMPLE 5

Methyl 2,5-seco-3,4-bisnor-5-aza-B-homopregnane-6,20-dione 2-oic acid

Following the methylation procedure described in Example 2, but substituting an equivalent amount of the product of Example 4 for the 3-oxa-A-norpregnane-5β-ol-2,20-dione 20-ethylene ketal, there is obtained the title compound.

EXAMPLE 6

2,20β - dihydroxy - 2,5 - seco - 3,4 - bisnor - 5 - aza - B-homopregnane; 2,20α - dihydroxy - 2,5 - seco - 3,4-bisnor-5-aza-B-homopregnane A solution of 1.4 g. of methyl 2,5-seco-3,4-bisnor-5-aza-B-homopregnane-6,20-dione 2-oic acid in 150 ml. of tetrahydrofuran is treated with 2.0 g. of lithium aluminum hydride and refluxed for three days. Excess hydride is destroyed by the addition of ethyl acetate. The reaction mixture is treated with 2 N sodium hydroxide solution, the layers separated, and the aqueous phase extracted with additional chloroform. The combined organic fractions are washed with 8% salt solution, dried and evaporated to give a mixture of 2,20β-dihydroxy- and 2,20α - dihydroxy - 2,5 - seco-3,4-bisnor-5-aza-B-homopregnane, which is separated by chromatography on neutral alumina. If desired, however, and as illustrated, the mixture may be used directly for the next chemical step.

EXAMPLE 7

N - acetyl - 2,20β - diacetoxy - 2,5 - seco - 3,4 - bisnor-5 - aza - B - homopregnane; N - acetyl - 2,20α - diacetoxy-2,5-seco-3,4-bisnor-5-aza-B-homopregnane A solution of 1.3 g. of a mixture of 2,20β-dihydroxy- and 2,20α - dihydroxy - 2,5 - seco - 3,4-bisnor-5-aza-B-homopregnane in 7 ml. of acetic anhydride and 7 ml. of pyridine is left at room temperature overnight. The reaction mixture is diluted with water and extracted with chloroform. The chloroform extracts are washed with 2 N HCl, water and 8% salt solution, dried and evaporated to give a mixture of N-acetyl-2,20β-diacetoxy- and N-acetyl - 2,20α - diacetoxy - 2,5-seco-3,4-bisnor-5-aza-B-homopregnane, which is separated by chromatography on neutral alumina. As above, the mixture may, if desired, be used directly for the next chemical step.

EXAMPLE 8

N-acetyl-2,20β-dihydroxy-2,5-seco - 3,4 - bisnor - 5 - aza-B - homopregnane; N-acetyl-2,20α-dihydroxy-2,5-seco-3,4-bisnor-5-aza-B-homopregnane A solution of 2.4 g. of a mixture of N-acetyl-2,20β-diacetoxy- and N - acetyl-2,20α - diacetoxy-2,5-seco-3,4-bisnor-5-aza-B-homopregnane in 300 ml. of methanol is treated with 44 ml. of 10% potassium carbonate solution and stirred overnight at room temperature. The solution is concentrated, diluted with water, neutralized with acetic acid and extracted with chloroform. The chloroform extracts are washed with 8% salt solution, dried and evaporated to give a mixture of N-acetyl-2,20β-dihydroxy- and N - acetyl - 2,20α-dihydroxy-2,5-seco-3,4-bisnor-5-aza-B-homopregnane, which is separated by chromatography on neutral alumina. As above, the mixture may be used directly for the next chemical step.

EXAMPLE 9

N - acetyl - 2,5 - seco - 3,4 - bisnor - 5 - aza - B - homopregnane-2-al-20-one

A solution of 600 mg. of a mixture of N-acetyl-2,20β-dihydroxy and N-acetyl 2,20α-dihydroxy-2,5-seco-3,4-bisnor - 5 - aza - B - homopregnane in 60 ml. of acetone is cooled to 3.5° and treated with an excess of Jones reagent. After 2 hr. at 3.5°, methanol is added to decompose excess oxidant and water is added. The organic solvents are evaporated and the aqueous phase extracted with chloroform. The chloroform extracts are washed with water, 8% salt solution, dried and evaporated to give N - acetyl - 2,5 - seco-3,4-bisnor-5-aza-B-homopregnane-2-al-20-one.

EXAMPLE 10

N - acetyl - 2,5 - seco - 3,4 - bisnor - 5 - aza - B - homopregnane-20-one-2-oic acid A solution of 2.5 g. of silver nitrate in 25 ml. of water is added to a solution of 2.5 g. of N-acetyl-2,5-seco-3,4-bisnor - 5 - aza - B - homopregnane - 2 - al - 20 - one in 50 ml. of 95% ethanol. This solution is treated dropwise with a solution of 2.5 g. of sodium hydroxide in 45 ml. of water and the resulting suspension stirred in the dark for 4 hr. The precipitate is removed by filtration and washed with water and the filtrate is extracted with chloroform. The aqueous phase is acidified and extracted with chloroform. The chloroform extracts are washed with 8% salt solution, dried and evaporated to give N-acetyl-2,5-seco-3,4-bisnor-5-aza-B-homopregnane-20-one-2-oic acid.

EXAMPLE 11

Methyl N - acetyl - 2,5-seco-3,4-bisnor-5-aza-B-homopregnane-20-one-2-oic acid

Following the methylation procedure described in Example 2, but substituting an equivalent amount of the product of Example 10 for the 3-oxa-A-norpregnane-5β-ol-2, 20-dione 20-ethylene ketal, there is obtained the title compound.

EXAMPLE 12

2 - carboxy - 2,5 - seco - 3,4 - bisnor - 5 - aza - B - homopregnane-20-one

A solution of 400 mg. of N-acetyl-2,5-seco-3,4-bisnor-5-aza-B-homopregnane-20-one-2 - oic acid in 0.5 ml. of water, 7.5 ml. of concentrated HCl and 25 ml. of dioxane is refluxed for 15 hr. and then evaporated. The residue is dissolved in water and the pH of this solution adjusted to pH 5.1 with sodium bicarbonate solution, and 8% salt solution added. This aqueous solution is extracted with chloroform. The aqueous layer is then adjusted to pH 5.5 and evaporated. The residue is treated with several portions of chloroform. The chloroform layers are dried and evaporated to give 2-carboxy-2,5-seco-3,4-bisnor-5-aza-B-homopregnane-20-one.

EXAMPLE 13

3,4-bisnor-5-aza-B-homopregnane-2,20-dione

A solution of 450 mg. of 2-carboxy-2,5-seco-3,4-bisnor-5-aza-B-homopregnane-20-one in 15 ml. of nitromethane is treated with 270 mg. of dicyclohexylcarbodiimide and stirred at room temperature for two days. The N,N'-dicyclohexylurea is removed by filtration and the filtrate evaporated. The residue is plate chromatographed on neutral alumina using chloroform-hexane (1:1) as the developing solvent and the major band is detected with iodine vapor. Elution with ethyl acetate and evaporation gives 3,4-bisnor-5-aza-B-homopregnane-20-one.

EXAMPLE 14

3-oxa-A-nor-B-norpregnane-5β-ol-2,20-dione

A suspension of 344 mg. of potassium carbonate, 45 mg. of potassium permanganate and 1.42 g. of sodium metaperiodate in 40 ml. of water is added to a solution of 250 mg. of A-nor-B-norprogesterone in 40 ml. of t-butanol and stirred overnight at room temperature. The mixture is diluted with water, acidified with 2 N HCl and extracted with chloroform. The chloroform extracts are washed with 8% salt solution, dried and evaporated to give 3-oxa-A-nor-B-norpregnane-5β-ol-2,20-dione.

EXAMPLE 15

3 - oxa - A - nor - B - norpregnane - 5β - ol - 2,20-dione 20-ethylene ketal

Following the procedure of Example 1, but substituting an equivalent amount of the product of Example 14 for the 3-oxa-A-norpregnane-5β-ol-2,20-dione, there is obtained the title product.

EXAMPLE 16

Methyl 2,5 - seco - 3,4 - bisnor - B - norpregnane - 5,20-dione 20-ethylene ketal 2-oic acid Following the procedure of Example 2, but substituting an equivalent amount of the product of Example 15 for the 3 - oxa-A-norpregnane-5β-ol-2,20-dione 20 ethylene ketal, there is obtained the product.

EXAMPLE 17

Methyl 5 - oximino - 2,5-seco-3,4-bisnor-B-norpregnane-20-one 20-ethylene ketal 2-oic acid Following the procedure of Example 3, but substituting an equivalent amount of the product of Example 16 for the methyl 2,5-seco-3,4-bisnorpregnane-5,20-dione 20 ethylene ketal 2-oic acid, there is obtained the product.

EXAMPLE 18

2,5 - seco - 3,4 - bisnor - 5 - azapregnane - 6,20-dione 2-oic acid

Following the procedure of Example 4, but substituting an equivalent amount of the product of Example 17 for the methyl 5-oximino-2,5-seco-3,4-bisnorpregnane-20-one 20-ethylene ketal 2-oic acid, there is obtained the product.

EXAMPLE 19

Methyl 2,5 - seco - 3,4-bisnor-5-azapregnane-6,20-dione 2-oic acid

Following the procedure of Example 2, but substituting an equivalent amount of the product of Example 18 for the 3 - oxa-A-norpregnane-5β-ol-2,20-dione 20-ethylene ketal, there is obtained the product.

EXAMPLE 20

2,20β,dihydroxy - 2,5 - seco-3,4-bisnor-5-azapregnane; 2,20α-dihydroxy-2,5-seco-3,4-bisnor-5-azapregnane Following the procedure of Example 6, but substituting an equivalent amount of the product of Example 19 for the methyl 2,5 - seco - 3,4-bisnor-5-aza-B-homopregnane-6,20-dione 2-oic acid, there is obtained the product.

EXAMPLE 21

N - acetyl - 2,20β - diacetoxy - 2,5 - seco-3,4-bisnor-5-azapregnane; N - acetyl - 2,20α-diacetoxy-2,5-seco-3,4-bisnor-5-azapregnane Following the procedure of Example 7, but substituting an equivalent amount of the mixture produced in Example 20 for the mixture of 2,20β-dihydroxy- and 2,20α-dihydroxy - 2,5 - seco-3,4-bisnor-5-aza-B-homopregnane, there is obtained the product.

EXAMPLE 22

N - acetyl - 2,20β - dihydroxy - 2,5-seco - 3,4-bisnor-5-azapregnane; N - acetyl - 2,20α - dihydroxy-2,5-seco-3,4-bisnor-5-azapregnane Following the procedure of Example 8, but substituting an equivalent amount of the mixture produced in Example 21 for the mixture of N-acetyl-2,20β-diacetoxy- and N - acetyl - 2,20α - diacetoxy - 2,5-seco-3,4-bisnor-5-aza-B-homopregnane, there is obtained the product.

EXAMPLE 23

N-acetyl-2,5-seco-3,4-bisnor-5-azapregnane-2-al-20-one

Following the procedure of Example 9, but substituting an equivalent amount of the mixture produced in Example 22 for the mixture of N-acetyl-2,20β-dihydroxy- and N - acetyl-2,20α-dihydroxy-2,5-seco-3,4-bisnor-5-aza-B-homopregnane, there is obtained the product.

EXAMPLE 24

N-acetyl-2,5-seco-3,4-bisnor-5-azapregnane-20-one 2-oic acid

Following the procedure of Example 10, but substituting an equivalent amount of the product of Example 23 for the N - acetyl - 2,5 - seco-3,4-bisnor-5-aza-B-homopregnane-2-al-20-one, there is obtained the product.

EXAMPLE 25

Methyl N-acetyl-2,5-seco-3,4-bisnor-5-azapregnane-20-one 2-oic acid

Following the procedure of Example 2, but substituting an equivalent amount of the product of Example 24 for the 3-oxa - A - norpregnane-5β-ol-2,20-dione 20-ethylene ketal, there is obtained the product.

EXAMPLE 26

2-carboxy-2,5-seco-3,4-bisnor-5-azapregnane-20-one

Following the procedure of Example 12, but substituting an equivalent amount of the product of Example 25 for the N-acetyl-2,5-seco-3,4-bisnor-5-aza-B-homopregnane-20-one 2-oic acid, there is obtained the product.

EXAMPLE 27

3,4-bisnor-5-azapregnane-2,20-dione

Following the procedure of Example 13, but substituting an equivalent amount of the product of Example 26 for the 2-carboxy-2,5-seco-3,4-bisnor-5-aza-B-homopregnane-20-one, there is obtained the product.

What is claimed is:
1. A compound of the formula

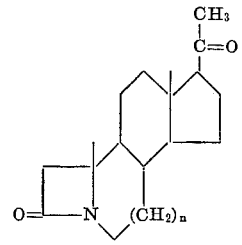

wherein $n$ represents 1 or 2.

2. A compound in accordance with claim 1 having the name 3,4-bisnor-5-aza-B-homopregnane-2,20-dione.

References Cited

UNITED STATES PATENTS 2,897,202  7/1959  Wildi _____ 260—287

ALEX MAZEL, Primary Examiner

R. V. RUSH, Assistant Examiner

U.S. Cl. X.R.

252—351, 357, 392, 396, 403, 407; 260—239.3, 287, 289, 340.9, 343.3, 799, 814; 424—244, 258